G. J. WINSLOW
WAGON SEAT.
APPLICATION FILED OCT. 5, 1914.
1,179,259.
Patented Apr. 11, 1916.
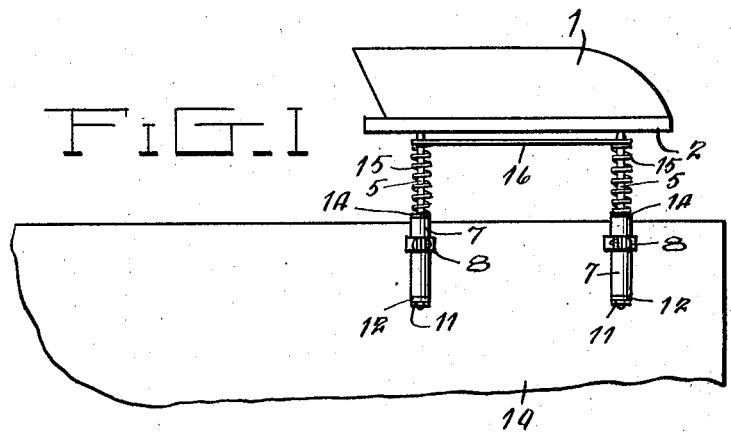
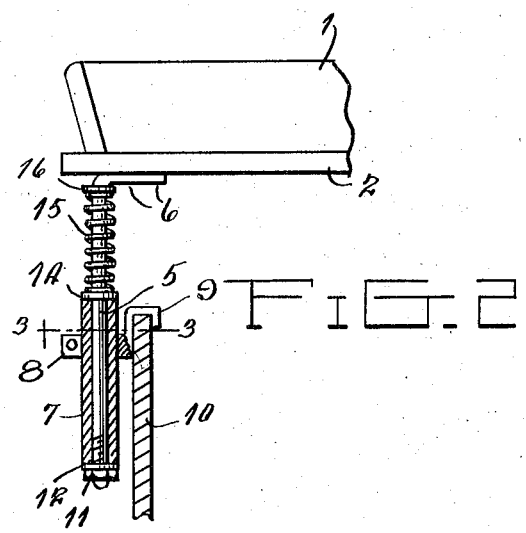
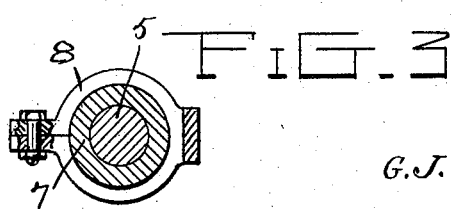
Inventor
G. J. Winslow

UNITED STATES PATENT OFFICE.

GEORGE J. WINSLOW, OF BISHOP, TEXAS.

WAGON-SEAT.

1,179,259.  Specification of Letters Patent.  Patented Apr. 11, 1916.

Application filed October 5, 1914. Serial No. 865,124.

*To all whom it may concern:*

Be it known that I, GEORGE J. WINSLOW, a citizen of the United States, residing at Bishop, in the county of Nueces and State of Texas, have invented certain new and useful Improvements in Wagon-Seats; and I do hereby declare the following to be a full, clear, and exact description of the invention, such as will enable others skilled in the art to which it appertains to make and use the same.

This invention relates to wagon seats, and the primary object of the invention is the provision of a detachable spring or resilient support for wagon seats, by means of which the seat may be detachably mounted upon a wagon at any desired point, as convenient.

Another object of this invention is the provision of a resilient support for wagon seats, which may be adjusted for positioning the seat at various elevations above the upper edge of the wagon.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters of reference designate like or corresponding parts throughout the several views, and in which:—

Figure 1 is a side elevation of a fragment of a wagon bed showing the improved seat attached thereto. Fig. 2 is a fragmentary view of a portion of the wagon seat showing a portion of the resilient support in sections, and Fig. 3 is a cross sectional view on the line 3—3 of Fig. 1.

Referring more particularly to the drawings, 1 designates a seat which is commonly used upon wagons and vehicles of similar construction, and it has attached to the under surface of the bottom 2 of the seat, upon the ends thereof, rods 5, which rods have their upper ends bent transversely to the body portion thereof and secured to the under surface of the seat by any suitable type of fastening means as is shown at 6 in Fig. 2 of the drawings.

The rods 5 depend from the bottom 2 of the wagon seat 1, and they are slidably seated in sleeves 7. The sleeves 7 have expansible collars 8 secured to their outer surface, which expansible collars have hook portions 9 formed thereupon for engagement with the upper end of the side or grain board of a wagon (not shown) for supporting the sleeve 7 in close proximity to the outer surface of the side 10 of the wagon. The rods 5 have their lower ends externally screw threaded, and nuts 11 are mounted upon the screw threaded end for holding said rods in adjusted positions within the sleeve 7. Washers 12 are interposed between the nut 11 and the lower terminal end of the sleeve 7. Collars 14 are mounted upon the rods 5, and they have the lower ends of spiral spring 15 abutting thereagainst. The other ends of the spiral springs 15 abut plates 16. The plates 16 extend laterally across the bottom 2 of the seat 1 at the ends of the same, and they are mounted upon the rod 5 as is clearly shown in Fig. 1 of the drawing. By the provision of the spiral springs 15 the seat 1 is resiliently supported above a wagon bed.

In the operation of the improved seat support: when a person seats himself upon the seat 1, his weight will compress the spiral springs 15 to a certain extent and the springs will resiliently support the seat, so that the shocks occasioned by rough travel of the wagon will be absorbed by the spiral springs preventing the administration of the shock to the seat.

The tension of the springs 15 may be regulated by the adjustment of the nuts 11 upon the externally screw threaded ends of the rods 5, which will regulate the shock absorbing proclivities of the springs making them more or less susceptible to movement under weight.

In reducing the invention to practice, minor features of construction, combination and arrangement of parts may necessitate alterations to which the patentee is entitled provided such alterations are comprehended within the scope of what is claimed.

What is claimed is:—

In a wagon seat support, the combination with an ordinary wagon seat, of a plurality of depending vertically extending rods, said rods having their upper ends bent angularly, said angularly bent ends secured to the undersurface of the wagon seat adjacent the ends thereof, sleeves, split rings detachably mounted upon the outer surface of said sleeves, hooks formed upon said rings and adapted for seating over the upper edge of the side boards of a wagon bed, said rods being slidably mounted within said sleeves, collars mounted upon said rods and adapted for engagement with the upper end of said sleeves, spiral springs coiled about said rods, plates connected to said rods, and having their under surfaces resting against the upper surfaces of said springs, the lower end of said rods being screw threaded, nuts mounted upon the screw threaded ends for adjusting the position of said rods in said sleeves.

In testimony whereof I affix my signature in presence of two witnesses.

GEORGE J. WINSLOW.

Witnesses:
R. B. HAMILTON,
V. H. MANTINS.

Copies of this patent may be obtained for five cents each, by addressing the "Commissioner of Patents Washington, D. C."